US011498568B2

(12) United States Patent
Huh

(10) Patent No.: US 11,498,568 B2
(45) Date of Patent: Nov. 15, 2022

(54) VEHICLE AND METHOD OF CONTROLLING THE SAME

(71) Applicants: Hyundai Motor Company, Seoul (KR); Kia Motors Corporation, Seoul (KR)

(72) Inventor: Jeewook Huh, Gwangmyeong-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 245 days.

(21) Appl. No.: 16/837,545

(22) Filed: Apr. 1, 2020

(65) Prior Publication Data

US 2021/0122377 A1 Apr. 29, 2021

(30) Foreign Application Priority Data

Oct. 23, 2019 (KR) ........................ 10-2019-0131904

(51) Int. Cl.

*B60W 30/19* (2012.01)
*B60W 10/11* (2012.01)
*B60W 30/18* (2012.01)
*B60W 40/04* (2006.01)
*B60W 40/105* (2012.01)

(52) U.S. Cl.

CPC ............ *B60W 30/19* (2013.01); *B60W 10/11* (2013.01); *B60W 30/181* (2013.01); *B60W 40/04* (2013.01); *B60W 40/105* (2013.01); *B60W 2554/408* (2020.02); *B60W 2710/1005* (2013.01)

(58) Field of Classification Search

CPC .... B60W 30/19; B60W 30/181; B60W 10/11; B60W 40/04; B60W 40/105

See application file for complete search history.

(56) References Cited

U.S. PATENT DOCUMENTS 8,483,949 B2 * 7/2013 Taguchi .............. B60W 50/085 701/25
9,643,621 B2 * 5/2017 Eo ........................ B60W 50/082
9,783,200 B2 * 10/2017 Park ................ B60W 30/18072
10,442,434 B2 * 10/2019 Huh ....................... B60W 10/08
10,493,989 B2 * 12/2019 Park ................ B60W 30/18072
2010/0324795 A1 * 12/2010 Tsumori ................ B60W 30/18 701/70
2014/0088858 A1 * 3/2014 Stefan ................. B60R 16/0236 701/123
2015/0298699 A1 10/2015 Poechmueller et al.
2017/0080806 A1 * 3/2017 Woo .......................... B60L 3/12
2019/0210604 A1 7/2019 Limbacher

FOREIGN PATENT DOCUMENTS

DE 102015008423 A1 1/2017

* cited by examiner

*Primary Examiner* — Tinh Dang
(74) *Attorney, Agent, or Firm* — Slater Matsil, LLP

(57) ABSTRACT

A method of controlling inertial driving of a vehicle is provided. The method includes, when in an inertial driving guidance mode, obtaining information related to at least one event in consideration of a vehicle ahead situation, wherein the at least one event is a stop event, a deceleration event, or a re-acceleration event, determining a target shift stage corresponding to the at least one event based on the information related to the at least one event, and performing a shift control to the target shift stage.

20 Claims, 4 Drawing Sheets

START
312 INERTIAL DRIVING GUIDANCE? — NO / YES
322 STOP? — NO / YES(STOP)
362 DECELERATION? — NO (RE-ACCELERATION) / YES(DECELERATION)
324 DETERMINE STOP TARGET SPEED
326 CALCULATE MAXIMUM EFFICIENCY VEHICLE SPEED
364 DETERMINE DECELERATION TARGET SPEED
366 CALCULATE BASE SPEED FOR EACH SHIFT STAGE
384 DETERMINE RE-ACCELERATION TARGET SPEED
386 CALCULATE BASE SPEED FOR EACH SHIFT STAGE
388 CALCULATE SHIFT STAGE CORRESPONDING TO EXPECTED SPEED
390 CALCULATE SHIFT STAGE CORRESPONDING TO TARGET SPEED
340 CALCULATES TARGET SHIFT STAGE
END

VEHICLE AND METHOD OF CONTROLLING THE SAME

CROSS-REFERENCE TO RELATED APPLICATIONS

This application claims priority to Korean Patent Application No. 10-2019-0131904, filed on Oct. 23, 2019, which application is hereby incorporated herein by reference.

TECHNICAL FIELD

The disclosure relates to a vehicle and method of controlling the same.

BACKGROUND

An eco-friendly vehicle is a vehicle that emits less or no pollutants than an internal combustion engine (ICE) vehicle that uses fossil fuels such as gasoline and diesel. Recently, eco-friendly vehicles are receiving much attention due to energy depletion and environmental pollution, and commercialization has already been made.

Most eco-friendly vehicles have been developed in the form of a vehicle driven by electric power, that is, a vehicle driven by the power of an electric motor.

Representative examples of the eco-friendly vehicles may include a pure electric vehicle (EV) driven by driving a motor with electric power stored in a battery, a hybrid electric vehicle (HEV) driven by an engine (internal combustion engine) and the motor, and a fuel cell electric vehicle (FCEV) driven by driving the motor with electric power generated by a fuel cell, etc. Among them, the hybrid vehicle may refer to a vehicle driven by the engine that generates driving power by burning fuel and the motor that generates driving power by electric energy of the battery. The hybrid vehicle is known as a plug-in hybrid electric vehicle (PHEV) that charges the battery by plugging into an electric outlet and a general HEV.

In addition, the hybrid vehicle having a power train configuration of a transmission mounted electric device (TMED) method in which the motor (drive motor) and a transmission are attached is known. The hybrid vehicle of the TMED method includes the engine and the motor serving as a driving source for driving the vehicle, an engine clutch interposed between the engine and the motor, the transmission connected to an output side of the motor, an inverter for operating the motor, and the battery connected to the motor through the inverter as a power source of the motor, and may be equipped with the transmission on the output side of the motor so that a motor output shaft is connected to a transmission input shaft. In addition, it is provided with the motor that is connected to the engine so as to transmit power to generate power with a rotational force transmitted from the engine, that is, a hybrid starter and generator (HSG).

The hybrid vehicles are driven in an electric vehicle (EV) mode, which is a pure electric vehicle mode using only the motor power, or a hybrid electric vehicle (HEV) mode using a combination of the engine power and the motor power.

On the other hand, in the eco-friendly vehicle such as the EV and the FCEV that uses the motor as the driving source of the vehicle, including hybrid vehicles (HEV and PHEV), a regenerative mode for charging the battery using the motor as a generator may be performed.

That is, a kinetic energy of the vehicle is converted into electric energy and recovered when the vehicle is braked by a brake device or when the vehicle drives using inertia (coasting).

In such a regenerative mode, the motor, which receives the kinetic energy of the vehicle, operates as the generator to charge the battery connected through the inverter, and at this time, energy recovery by the motor is possible, thereby improving fuel economy of the vehicle.

A vehicle deceleration during inertial driving is similar in that the battery is charged by the motor compared to regenerative braking performed by a driver pressing a brake pedal. However, unlike the regenerative braking which distributes the braking force of a friction braking force by the brake device and a regenerative braking force (electric braking force) by the motor, there is a difference in that the vehicle deceleration is performed only by a driving resistance of the vehicle and the motor without friction braking.

Meanwhile, in some hybrid vehicles recently commercialized, an inertial driving guidance function for guiding and inducing the driver's inertial driving at an appropriate time point when a deceleration event is present in front is applied. The inertial driving guidance function is a function of inducing the driver's inertial driving operation by operating an indicator of a cluster and the like when the vehicle deceleration is possible to a target speed by the inertial driving.

When the driver confirms that the inertial driving is possible through the indicator or the like, the driver maintains the accelerator pedal and the brake pedal in an off state so that the vehicle decelerates from a target position of the deceleration event to the target speed while in an inertial driving state and recovers the energy by the motor during the inertial driving.

However, a conventional inertial driving guidance function mainly focuses on determining a predicted speed and an inertial driving start time from a current vehicle position to the target position which is a deceleration event position based on a current vehicle condition and road conditions and guiding the driver to start the inertial driving at the determined start time.

Therefore, since an active control of the vehicle is not possible, the inertial driving guidance function has to be limitedly used, and there are various problems such as difficulty in maximizing fuel efficiency improvement due to low accuracy and reliability of control for the inertial driving and guidance.

SUMMARY

The disclosure relates to a vehicle. Particular embodiments relate to a shift control of the vehicle.

An embodiment of the disclosure can induce an inertial driving through an inertial driving guidance to a driver and can provide further improved fuel economy through an optimal shift control during the inertial driving.

Additional aspects of the disclosure will be set forth in part in the description which follows and, in part, will be obvious from the description, or may be learned by practice of the disclosure.

In accordance with an embodiment of the disclosure, a method of controlling inertial driving of a vehicle includes, when in an inertial driving guidance mode, obtaining, by a controller, information related to at least one of a stop event, a deceleration event, and a re-acceleration event in consideration of a vehicle ahead situation, determining, by the controller, a target shift stage corresponding to the at least one event based on the information related to at least one of the stop event, the deceleration event, and the re-acceleration event, and performing, by the controller, a shift control to the target shift stage.

The method may further include, when the at least one event is the stop event, calculating a target speed corresponding to the stop event, and determining a target shift stage corresponding to the stop event based on the information related to the at least one event and the target speed.

The method may further include, when the at least one event is the deceleration event, calculating a target speed corresponding to the deceleration event, and determining a target shift stage corresponding to the deceleration event based on the information related to the at least one event and the target speed.

The method may further include, when the at least one event is the re-acceleration event, calculating a base speed per shift stage of the vehicle, calculating a shift stage corresponding to an expected speed of the vehicle, calculating a shift stage corresponding to a target speed of the vehicle, and determining the target shift stage of the vehicle based on the shift stage of the expected speed and the shift stage of the target speed.

The method may further include, when there is a common shift stage among the shift stage of the expected speed and the shift stage of the target speed, determining the common shift stage as the target shift stage corresponding to the re-acceleration event.

The method may further include, when the shift stage of the expected speed and the shift stage of the target speed coincide with each other, determining a lowest shift stage among the matching shift stages as the target shift stage corresponding to the re-acceleration event.

In accordance with another embodiment of the disclosure, a vehicle includes an inertial driving guider configured to guide inertial driving, and a controller configured to, when in an inertial driving guidance mode, obtain information related to at least one of a stop event, a deceleration event, and a re-acceleration event in consideration of a vehicle ahead situation, and determine a target shift stage corresponding to the at least one event based on the information related to at least one of the stop event, the deceleration event, and the re-acceleration event.

When the at least one event is the stop event, the controller may be configured to calculate a target speed corresponding to the stop event, and to determine a target shift stage corresponding to the stop event based on the information related to the at least one event and the target speed.

When the at least one event is the deceleration event, the controller may be configured to calculate a target speed corresponding to the deceleration event, and to determine a target shift stage corresponding to the deceleration event based on the information related to the at least one event and the target speed.

When the at least one event is the re-acceleration event, the controller is configured to calculate a base speed per shift stage of the vehicle, to calculate a shift stage corresponding to an expected speed of the vehicle, to calculate a shift stage corresponding to a target speed of the vehicle, and to determine the target shift stage of the vehicle based on the shift stage of the expected speed and the shift stage of the target speed.

When there is a common shift stage among the shift stage of the expected speed and the shift stage of the target speed, the controller may be configured to determine the common shift stage as the target shift stage corresponding to the re-acceleration event.

When the shift stage of the expected speed and the shift stage of the target speed coincide with each other, the controller may be configured to determine a lowest shift stage among the matching shift stages as the target shift stage corresponding to the re-acceleration event.

In accordance with another embodiment of the disclosure, a method of controlling inertial driving of a vehicle includes, when in an inertial driving guidance mode, obtaining, by a controller, information related to a stop event in consideration of a vehicle ahead situation, determining, by the controller, a target shift stage corresponding to at least one event based on the information related to the stop event, and performing, by the controller, a shift control to the target shift stage.

In accordance with another embodiment of the disclosure, a method of controlling inertial driving of a vehicle includes, when in an inertial driving guidance mode, obtaining, by a controller, information related to a deceleration event in consideration of a vehicle ahead situation, determining, by the controller, a target shift stage corresponding to at least one event based on the information related to the deceleration event, and performing, by the controller, a shift control to the target shift stage.

In accordance with another embodiment of the disclosure, a method of controlling inertial driving of a vehicle includes, when in an inertial driving guidance mode, obtaining, by a controller, information related to a re-acceleration event in consideration of a vehicle ahead situation, determining, by the controller, a target shift stage corresponding to at least one event based on the information related to the re-acceleration event, and performing, by the controller, a shift control to the target shift stage.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION OF ILLUSTRATIVE EMBODIMENTS

Figure 1:
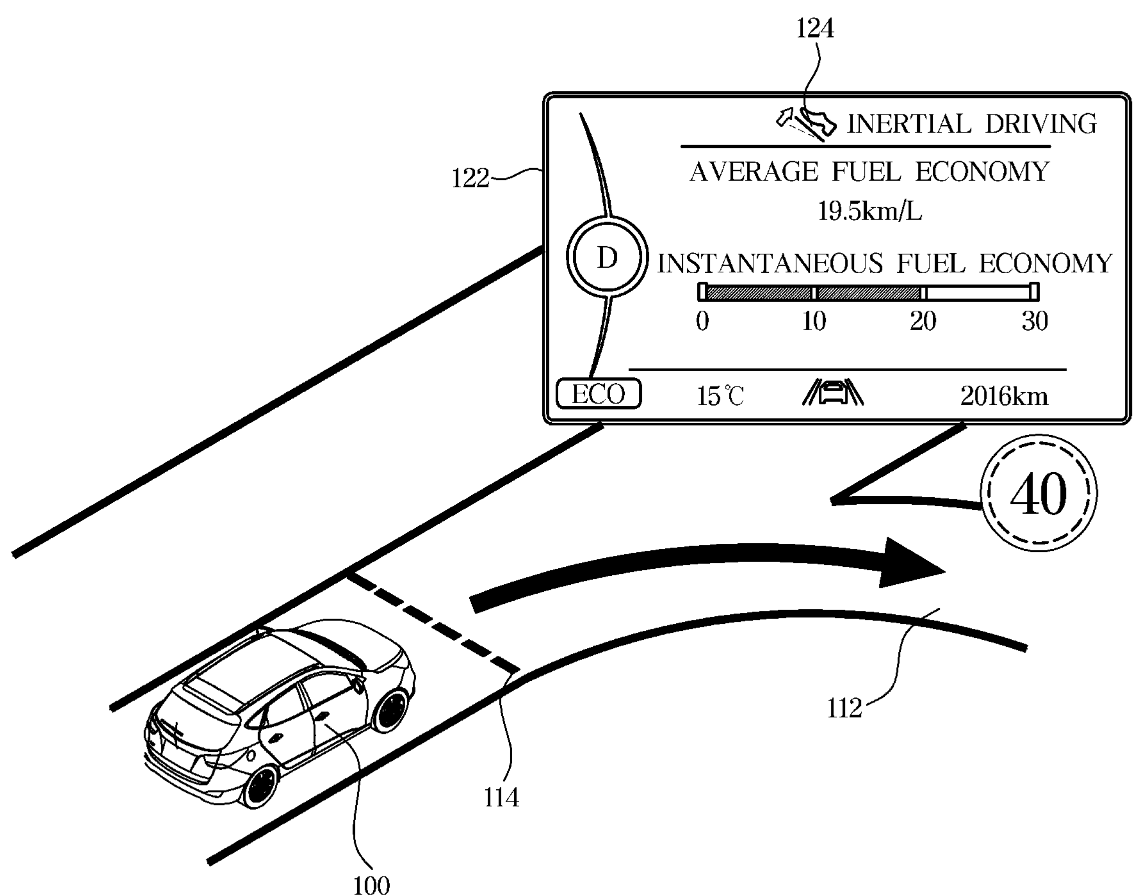
FIG. 1 is a view illustrating a concept of an inertial driving guidance of a vehicle according to exemplary embodiments of the disclosure.

FIG. 1 is a view illustrating a concept of an inertial driving guidance of a vehicle according to exemplary embodiments of the disclosure.

An 'inertial driving guidance (coasting driving guidance)' may be a function to help a driver's fuel economy driving. The inertial driving guidance may display a time when an accelerator pedal is released or a brake is used on an inertial driving guider 122 (for example, a cluster) in advance by receiving road analysis information from a navigation prior to the occurrence of an event in which a deceleration is predicted due to a change in a direction of a vehicle 100 or a passage of a toll gate, thereby reducing fuel consumption and improving fuel economy.

According to an embodiment of the disclosure, a prediction speed according to a front situation of the vehicle 100 is calculated, and the vehicle 100 is controlled to drive at a target speed suitable for the front situation in consideration of a current speed and the prediction speed. Here, the prediction speed of the vehicle 100 is a speed profile when inertial driving guidance starts and drives only in inertial driving (coasting driving). The target speed of the vehicle 100 is a target speed (stop, deceleration, re-acceleration, etc.) to be secured through the inertial driving guidance of the vehicle 100.

Referring to FIG. 1, when the vehicle 100 drives a road at a speed limit of 100 km/h toward a destination, and after a while, the vehicle 100 needs to exit to a branch road 112 having a speed limit of 40 km/h, an inertial driving guidance indication 124 is displayed on the inertial driving guider 122 at an inertial driving guidance time 114 outside a certain distance before the vehicle 100 approaches the branch road 112. Therefore, the driver of the vehicle 100 may recognize the necessity of the inertial driving by looking at the inertial driving guidance indication 124 and the driver may release the accelerator pedal and perform inertial driving.

Figure 2:
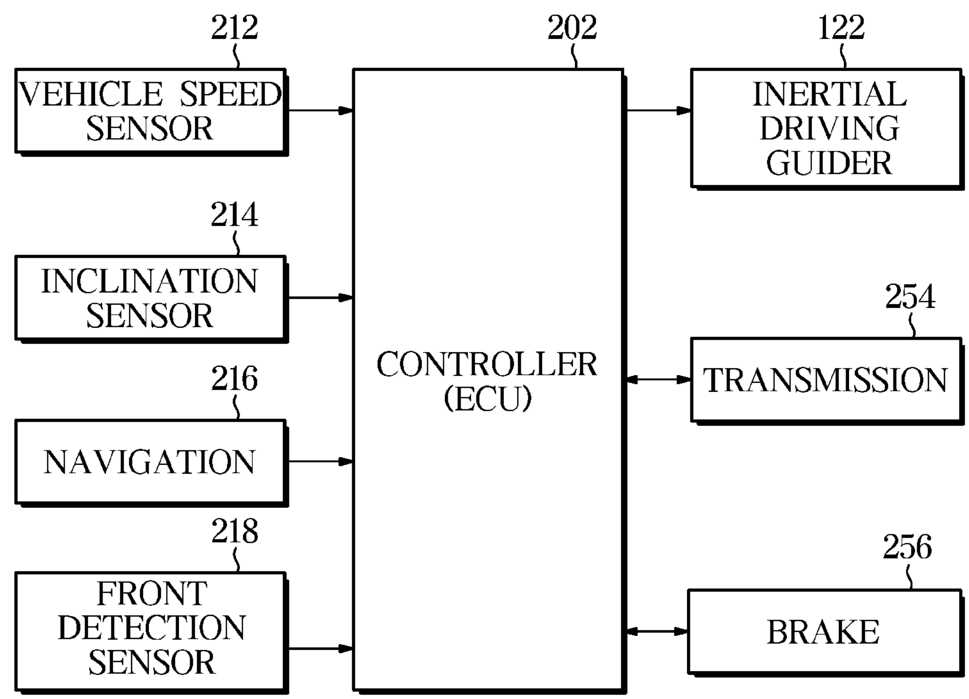
FIG. 2 is a view illustrating a control system of a vehicle according to exemplary embodiments of the disclosure.

FIG. 2 is a view illustrating a control system of a vehicle according to exemplary embodiments of the disclosure.

Referring to FIG. 2, a vehicle speed sensor 212, an inclination sensor (gradient sensor) 214, a navigation 216, and a front detection sensor 218 are connected to an input side of a controller 202 so as to communicate with each other. In addition, an inertial driving guider (for example, the cluster) 122, a transmission 254, and a brake 256 are connected to an output side of the controller 202 so as to communicate with each other.

The controller 202 may induce the driver to use the inertial driving through the inertial driving guidance, and then perform an optimal shift control during the inertial driving, thereby further improving fuel economy.

The vehicle speed sensor 212 may be provided to detect a speed of the vehicle 100.

The inclination sensor 214 may be provided to detect the inclination (gradient) of the road on which the vehicle wo is driving. The controller 202 may detect an inclination of a current position of the vehicle wo through the inclination sensor 214. In addition, the controller 202 may detect an average inclination of the road on which the vehicle wo has driven from a certain distance before to the current position.

The navigation 216 may be provided to provide map information around the vehicle wo and guide a path to a target point set by the driver. The controller 202 may obtain information necessary for the inertial driving guidance from the navigation 216 in advance. For example, the navigation 216 may determine in advance whether the vehicle 100 will face an event requiring the inertial driving guidance at some point.

The front detection sensor 218 may be provided to detect roads, structures, obstacles, pedestrians, and the like in front of the vehicle 100. The front detection sensor 218 may include a radar, a light detection and ranging (LiDAR), a camera, and the like. The controller 202 may obtain the information necessary for the inertial driving guidance in advance through a detection result of the front detection sensor 218. For example, it may be confirmed in advance through a detection result of the front detection sensor 218 whether the vehicle wo will face the event requiring the inertial driving guidance at some point.

The brake 256 includes a brake pedal position sensor. Therefore, when the driver operates a brake pedal, the controller 202 may recognize the driver's braking intention through this. The brake 256 may further include a device for regenerative braking.

Figure 3:
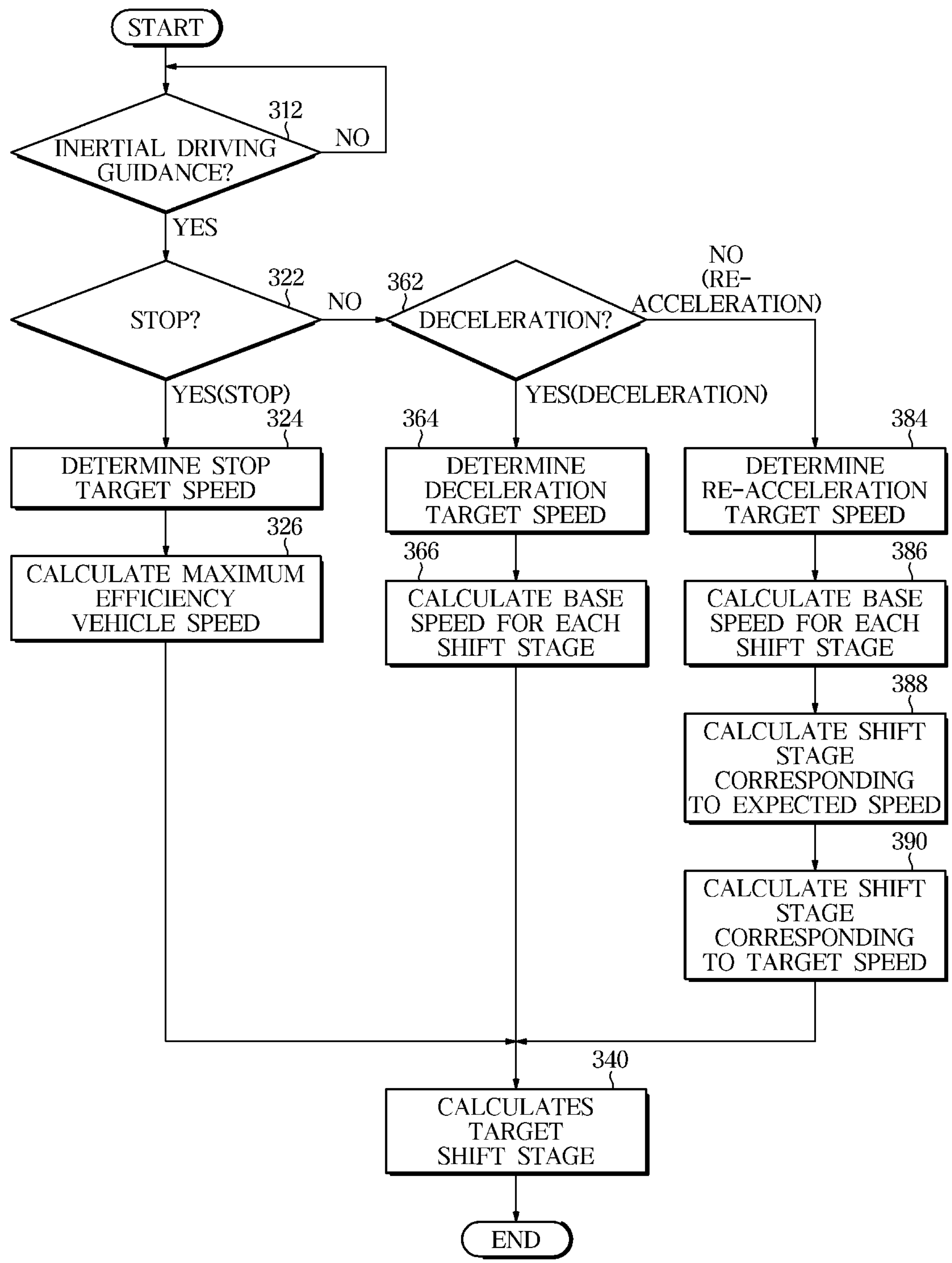
FIG. 3 is a view illustrating a method of controlling a vehicle according to exemplary embodiments of the disclosure.

FIG. 3 is a view illustrating a method of controlling a vehicle according to exemplary embodiments of the disclosure.

In a control method of FIG. 3, the controller 202 may classify an event that the vehicle 100 will face after the inertial driving guidance into three situations of 'stop', 'deceleration' and 're-acceleration' based on a predicted speed. The controller 202 may consider one of the three situations, 'stop', 'deceleration' and 're-acceleration', and may implement the optimal shift control for the situation.

The 'stop' situation is a situation in which the vehicle 100 stops completely, and is a case where the predicted speed of the vehicle 100 is 0 km/h or decelerates to a preset speed corresponding to the stop after the inertial driving guidance. For example, a situation in which the vehicle 100 turns left or right, passes a roundabout, makes a U-turn, or reaches the destination may be determined as the 'stop' situation.

The 'deceleration' situation is a situation in which the vehicle 100 is induced to decelerate below the preset speed, and is a case where deceleration to a relatively low speed is required even if the predicted speed of the vehicle 100 is not stopped until after the inertial driving guidance. For example, it can be determined as a 'deceleration' situation when passing through approach roads and access roads of a highway or crossing a junction.

The 're-acceleration' situation is a situation in which the vehicle 100 is predicted to be re-accelerated after deceleration after the inertial driving guidance, and an event where effects of transmission pattern control are relatively greater than the 'stop' and the 'deceleration' situations. For example, a situation where the vehicle 100 passes a speed camera or the toll gate may be determined as a re-acceleration situation.

Referring to FIG. 3, in a state where the inertial driving guidance function of the vehicle 100 is activated, the controller 202 may identify whether the vehicle 100 faces an event for the inertial driving guidance (312). That is, it is identified whether the inertial driving guidance is currently performed in the vehicle 100.

When the inertial driving guidance is being performed in the vehicle 100 (YES in 312), the controller 202 may control a shift stage of the transmission 254 by calculating an optimum target shift stage according to one of three situations: the 'stop', 'deceleration', and 're-acceleration' situations. To this end, the controller 202 may identify in advance whether the vehicle wo reaches the stop, decelerate, or re-accelerate situation during the inertial driving of the vehicle wo through the information of the navigation 216 or the front detection sensor 218.

When the vehicle 100 is predicted to stop during the inertial driving (YES in 322), the controller 202 may determine a stop target speed (324). In the case of the 'stop' situation, the inertial driving target speed becomes the target speed of the vehicle 100. In other words, the preset speed corresponding to 0 km/h or the 'stop' situation is the stop target speed of a 'stop' situation.

The controller 202 may calculate a maximum efficiency vehicle speed for stopping the vehicle 100 (326).

Figure 4:
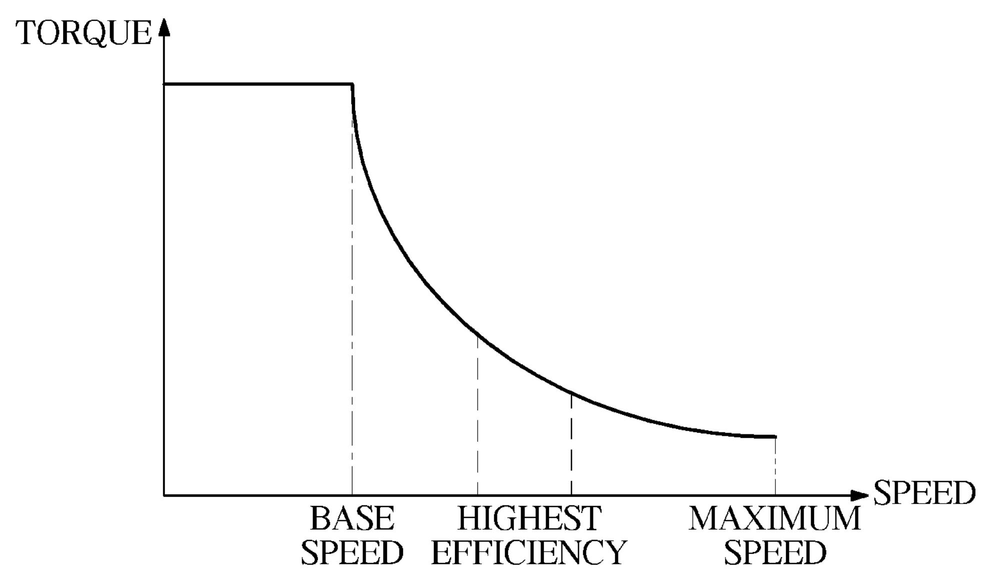
FIG. 4 is a view illustrating a relationship between a torque and a speed of a vehicle according to exemplary embodiments of the disclosure.

FIG. 4 is a view illustrating a relationship between a torque and a speed of a vehicle according to exemplary embodiments of the disclosure.

Referring to FIG. 4, a base speed and a maximum speed for each shift stage exist, and there is a section in which the highest efficiency of torque and speed is obtained therebetween. The controller 202 may calculate a maximum value and a minimum value of the highest efficiency section for each shift stage, and may calculate a vehicle speed at each of the maximum value and the minimum value.

Returning to FIG. 3, the controller 202 may calculate a target shift stage in which the vehicle 100 shifts to the stop (340). Since the re-acceleration is not expected in the 'stop' situation of the vehicle 100, the shift of the transmission 254 needs to be performed quickly in the maximum efficiency section. Therefore, whenever the vehicle speed reaches a speed corresponding to a lowest value or the lowest value+α of FIG. 4, the controller 202 may determine the lower shift stage as the target shift stage and shift down to the determined shift stage.

Returning to FIG. 3, when the vehicle 100 is not predicted to stop during the inertial driving (NO in 322), then deceleration during the inertial driving is determined (362). When the vehicle 100 is expected to slow down during the inertial driving (YES in 362), controller 202 may determine a deceleration target speed (364). In a case of the 'deceleration' situation, the inertial driving target speed becomes the target speed of the vehicle 100. In the case of the 'deceleration' situation, an expected speed until the vehicle 100 is stopped and the vehicle 100 will drive the certain distance at the expected vehicle speed becomes the deceleration target speed. In addition, since there is a possibility of re-acceleration at the expected speed, the shift is necessary considering the base speed of the expected speed. It is also necessary to determine whether the expected speed is a speed range of which shift stage.

The controller 202 may then calculate the base speed for each shift stage (366). As illustrated in FIG. 4 described above, the base speed for each shift stage may be calculated from the relationship between torque and speed.

Returning to FIG. 3, the controller 202 may calculate the target shift stage in the 'deceleration' situation (340). In this case, the controller 202 may determine a highest stage above the base speed as a target stage from the expected speed. For example, when the expected speed is 60 km/h at the base speed is 2000 rpm, a third gear ratio is 1.8, a fourth gear ratio is 1.2, a FGR is 3, and a tire's companion diameter is 0.30, it is 41.9 km/h in a third stage and 62.8 km/h is a fourth stage. In this case, when the transmission 254 is shifted to the fourth stage, a driving speed is lower than the base speed. Therefore, the third stage, which is one stage lower than the fourth stage, becomes the target shift speed in the 'deceleration' situation.

When the vehicle 100 is expected to be re-accelerated after deceleration during the inertial driving (NO in 362), the controller 202 may determine a re-acceleration target speed (384). In the case of the 're-acceleration' situation, the vehicle speed at which the vehicle 100 has driven immediately before the inertial driving guidance becomes the target speed. When re-accelerating, it is necessary to prevent an upshift after a downshift because the vehicle speed is increased again to the expected speed after deceleration.

The controller 202 may then calculate the base speed for each shift stage (386). As illustrated in FIG. 4 described above, the base speed for each shift stage may be calculated from the relationship between torque and speed.

Returning to FIG. 3, the controller 202 may calculate a shift stage corresponding to the expected speed (388). For example, when the expected speed is 70 km/h at the base speed is 2000 rpm, the fourth gear ratio is 1.2, a fifth gear ratio is 1.0, the FGR is 3, and the tire's diameter is 0.30, it is 62.8 km/h in the fourth stage and 75.4 km/h is a fifth stage.

In addition, the controller 202 may calculate the shift stage corresponding to the target speed (390). For example, when the expected speed is 80 km/h at the base speed is 2000 rpm, the fifth gear ratio is 1.0, a sixth gear ratio is 0.8, the FGR is 3, the tire's diameter is 0.30, it is 75.4 km/h in the fifth stage and 94.2 km/h is a sixth stage.

Subsequently, the controller 202 may select one of the shift stage of the expected speed and the shift stage of the target speed as the target shift stage (340). That is, in the above case, since the expected speed is 4 or 5 stages and the target speed is 5 or 6 stages, an overlapping 5 stages may be determined as the target shift stage in the 're-acceleration' situation. When the minimum and maximum vehicle speeds of the expected speed and the target speed are the same, the lower vehicle speed may be determined as the target shift stage.

According to the vehicle and the method of controlling the vehicle according to the exemplary embodiments, after inducing the inertial driving through the inertial driving guidance to the driver, it is possible to further improve fuel economy through the optimal shift control during the inertial driving.

The disclosed embodiments are merely illustrative of the technical idea, and those skilled in the art will appreciate that various modifications, changes, and substitutions may be made without departing from the essential characteristics thereof. Therefore, the exemplary embodiments disclosed above and the accompanying drawings are not intended to limit the technical idea, but to describe the technical spirit, and the scope of the technical idea is not limited by the embodiments and the accompanying drawings. The scope of protection shall be interpreted by the following claims, and all technical ideas within the scope of equivalent shall be interpreted as being included in the scope of rights.

What is claimed is:

1. A method of controlling inertial driving of a vehicle, the method comprising:

operating the vehicle in an inertial driving guidance mode;

obtaining information related to an event in consideration of a vehicle ahead situation, wherein the event comprises a stop event, a deceleration event, and a re-acceleration event;

when the event is the stop event, determining a first target shift stage corresponding to the stop event based on the information related to the stop event and performing a shift control to the first target shift stage;

when the event is the deceleration event, determining a second target shift stage corresponding to the deceleration event based on the information related to the deceleration event and performing a shift control to the second target shift stage; and when the event is the re-acceleration event, determining a third target shift stage corresponding to the re-acceleration event based on the information related to the reacceleration event and performing a shift control to the third target shift stage.

2. The method according to claim 1, wherein when the event is the stop event, the method comprises:

calculating a target speed corresponding to the stop event; and determining the first target shift stage corresponding to the stop event based on the information related to the event and the target speed.

3. The method according to claim 1, wherein when the event is the deceleration event, the method comprises:

calculating a target speed corresponding to the deceleration event; and determining the second target shift stage corresponding to the deceleration event based on the information related to the event and the target speed.

4. A method of controlling inertial driving of a vehicle, the method comprising:

operating the vehicle in an inertial driving guidance mode;

obtaining information related to an re-acceleration event in consideration of a vehicle ahead situation;

calculating a base speed per shift stage of the vehicle;

calculating a shift stage corresponding to an expected speed of the vehicle;

calculating a shift stage corresponding to a target speed of the vehicle; and determining a target shift stage of the vehicle based on the shift stage corresponding to the expected speed and the shift stage corresponding to the target speed; and performing a shift control to the target shift stage.

5. The method according to claim 4, wherein there is a common shift stage that includes both the shift stage corresponding to the expected speed and the shift stage corresponding to the target speed, the method further comprising determining the common shift stage as the target shift stage corresponding to the re-acceleration event.

6. The method according to claim 4, wherein the shift stage corresponding to the expected speed and the shift stage corresponding to the target speed coincide with each other, the method further comprising determining a lowest shift stage among the coinciding shift stages as the target shift stage corresponding to the re-acceleration event.

7. The method according to claim 1, wherein when the event is the re-acceleration event, the method comprises:

calculating a base speed per shift stage of the vehicle;

calculating a shift stage corresponding to an expected speed of the vehicle;

calculating a shift stage corresponding to a target speed of the vehicle; and determining the third target shift stage of the vehicle based on the shift stage corresponding to the expected speed and the shift stage corresponding to the target speed.

8. The method according to claim 7, wherein there is a common shift stage that includes both the shift stage corresponding to the expected speed and the shift stage corresponding to the target speed, the method comprises determining the common shift stage as the third target shift stage corresponding to the re-acceleration event.

9. The method according to claim 7, wherein the shift stage corresponding to the expected speed and the shift stage corresponding to the target speed coincide with each other, the method comprises determining a lowest shift stage among the coinciding shift stages as the third target shift stage corresponding to the re-acceleration event.

10. A vehicle comprising:

an inertial driving guider configured to guide inertial driving; and a controller configured to:

when in an inertial driving guidance mode, obtain information related an event in consideration of a vehicle ahead situation, wherein the controller is configured to operate in response to each of a stop event, a deceleration event, and a reacceleration event; and when the event is the stop event, determine a first target shift stage corresponding to the stop event based on the information related to the event;

when the event is the deceleration event, determine a second target shift stage corresponding to the deceleration event based on the information related to the deceleration event; and when the event is the re-acceleration event, determine a third target shift stage corresponding to the re-acceleration event based on the information related to the reacceleration event.

11. The vehicle according to claim 10, wherein, when the event is the stop event, the controller is configured to:

calculate a target speed corresponding to the stop event; and determine the first target shift stage corresponding to the stop event based on the information related to the event and the target speed.

12. The vehicle according to claim 10, wherein, when the event is the deceleration event, the controller is configured to:

calculate a target speed corresponding to the deceleration event; and determine the second target shift stage corresponding to the deceleration event based on the information related to the event and the target speed.

13. A vehicle comprising:

an inertial driving guider configured to guide inertial driving; and a controller configured to:

when in an inertial driving guidance mode, obtain information related a re-acceleration event in consideration of a vehicle ahead situation;

calculate a base speed per shift stage of the vehicle;

calculate a shift stage corresponding to an expected speed of the vehicle;

calculate a shift stage corresponding to a target speed of the vehicle; and determine a target shift stage of the vehicle based on the shift stage corresponding to the expected speed and the shift stage corresponding to the target speed.

14. The vehicle according to claim 13, wherein, when there is a common shift stage that includes both the shift stage corresponding to the expected speed and the shift stage corresponding to the target speed, the controller is configured to determine the common shift stage as the target shift stage corresponding to the re-acceleration event.

15. The vehicle according to claim 13, wherein, when the shift stage corresponding to the expected speed and the shift stage corresponding to the target speed coincide with each other, the controller is configured to determine a lowest shift stage among the coinciding shift stages as the target shift stage corresponding to the re-acceleration event.

16. A vehicle comprising:

an inertial driving guider configured to guide inertial driving; and a controller configured to:

when in an inertial driving guidance mode, obtain information related an event in consideration of a vehicle ahead situation, wherein the controller is configured to operate in response to each of a stop event, a deceleration event, and a re-acceleration event; and determine a target shift stage corresponding to the event based on the information related to the event;

when the event is the stop event, calculate a target speed corresponding to the stop event and determine the target shift stage corresponding to the stop event based on the information related to the event and the target speed;

when the event is the deceleration event, calculate a target speed corresponding to the deceleration event and determine the target shift stage corresponding to the deceleration event based on the information related to the event and the target speed; and when the event is the re-acceleration event, calculate a base speed per shift stage of the vehicle, calculate a shift stage corresponding to an expected speed of the vehicle, calculate a shift stage corresponding to a target speed of the vehicle, and determine the target shift stage of the vehicle based on the shift stage corresponding to the expected speed and the shift stage corresponding to the target speed.

17. The vehicle according to claim 16, wherein, when the event is the re-acceleration event and there is a common shift stage that includes both the shift stage corresponding to the expected speed and the shift stage corresponding to the target speed, the controller is configured to determine the common shift stage as the target shift stage corresponding to the re-acceleration event.

18. The vehicle according to claim 16, wherein, when the event is the re-acceleration event and the shift stage corresponding to the expected speed and the shift stage corresponding to the target speed coincide with each other, the controller is configured to determine a lowest shift stage among the coinciding shift stages as the target shift stage corresponding to the re-acceleration event.

19. The vehicle according to claim 10, wherein, when the event is the re-acceleration event, the controller is configured to:

calculate a base speed per shift stage of the vehicle;

calculate a shift stage corresponding to an expected speed of the vehicle;

calculate a shift stage corresponding to a target speed of the vehicle; and determine the third target shift stage of the vehicle based on the shift stage corresponding to the expected speed and the shift stage corresponding to the target speed.

20. The vehicle according to claim 19, wherein, when there is a common shift stage that includes the shift stage corresponding to the expected speed and the shift stage corresponding to the target speed, the controller is configured to determine the common shift stage as the third target shift stage corresponding to the re-acceleration event.

* * * * *